United States Patent [19]

Niino et al.

[11] Patent Number: 5,019,328
[45] Date of Patent: May 28, 1991

[54] NATURAL CIRCULATION TYPE BOILING LIGHT-WATER REACTOR

[75] Inventors: Tsuyoshi Niino; Tadakazu Nakayama; Ryozo Tsuruoka; Minoru Miki; Nobukatsu Iwata; Kazuhito Koyama, all of Hitachi, Japan

[73] Assignees: Hitachi, Ltd., Tokyo; Hitachi Engineering Co., Ltd., Ibaraki, both of Japan

[21] Appl. No.: 330,318

[22] Filed: Mar. 29, 1989

[30] Foreign Application Priority Data

Mar. 31, 1988 [JP] Japan .................................. 63-79093

[51] Int. Cl.⁵ ............................................ G21C 19/42
[52] U.S. Cl. .................................... 376/310; 376/366; 376/370; 376/371; 376/373; 376/378; 376/379
[58] Field of Search ............... 376/310, 370, 371, 366, 376/379, 373, 378

[56] References Cited

U.S. PATENT DOCUMENTS

| | | | |
|---|---|---|---|
| 4,012,490 | 3/1977 | Lotredo | 423/262 |
| 4,259,154 | 3/1981 | Nino et al. | 376/293 |
| 4,383,969 | 5/1983 | Bleiei | 376/313 |
| 4,495,142 | 1/1985 | Nakayama et al. | 376/251 |
| 4,918,313 | 4/1990 | Dubaie et al. | 250/356.2 |

Primary Examiner—Stephen J. Lechert, Jr.
Assistant Examiner—Nina Bhat
Attorney, Agent, or Firm—Antonelli, Terry, Stout & Kraus

[57] ABSTRACT

A natural circulation type boiling light-water reactor comprises a pressure vessel, a reactor core disposed within said pressure vessel to heat light water so as to generate main steam, a steam outlet provided in a wall of said pressure vessel for drawing out the main steam therethrough to supply the same to a turbine system, and a steam path along which the main steam flows from the reactor core to the steam outlet. The reactor further comprises a steam guide for prolonging the steam path and/or a radially increased chimney for reducing the velocity of the main steam flowing through the steam path. These causes radioactive isotope $^{16}N$ contained in the main steam to flow within the pressure vessel for a time period exceeding its own half-life, so that the inventory of $^{16}N$ in the main steam directed towards the turbine system is reduced remarkably. In consequence, shield structures for piping and turbine systems can be reduced in size and weight.

9 Claims, 5 Drawing Sheets

FIG. 3A
FIG. 3B
PRIOR ART
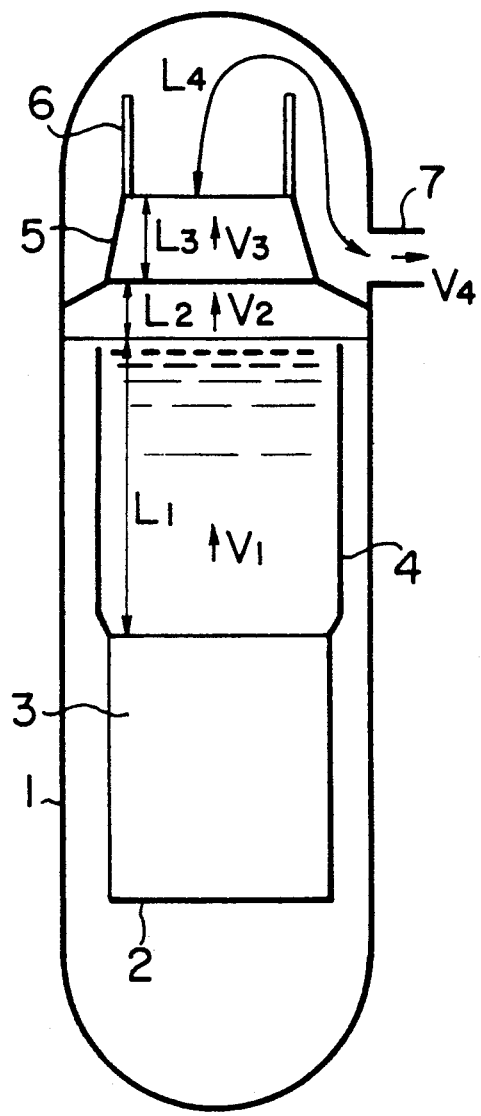
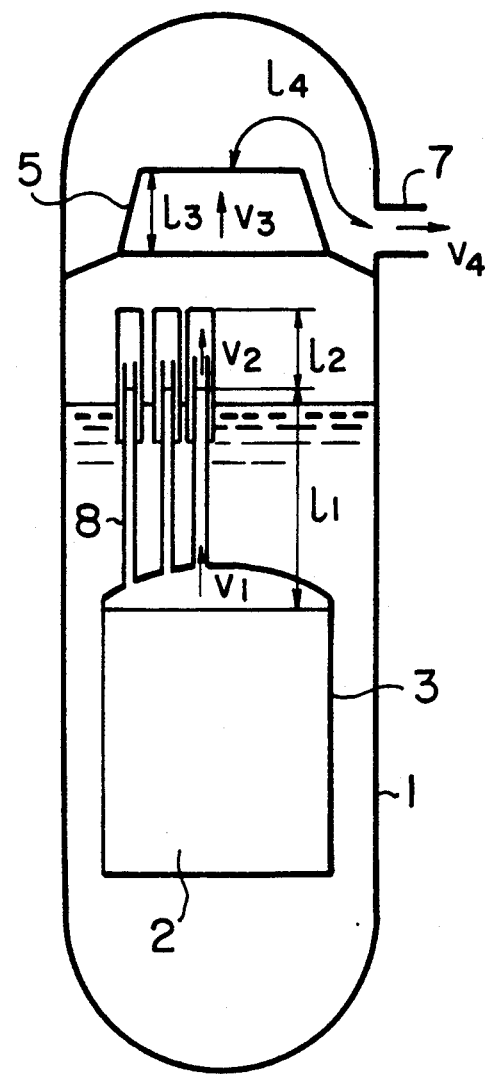

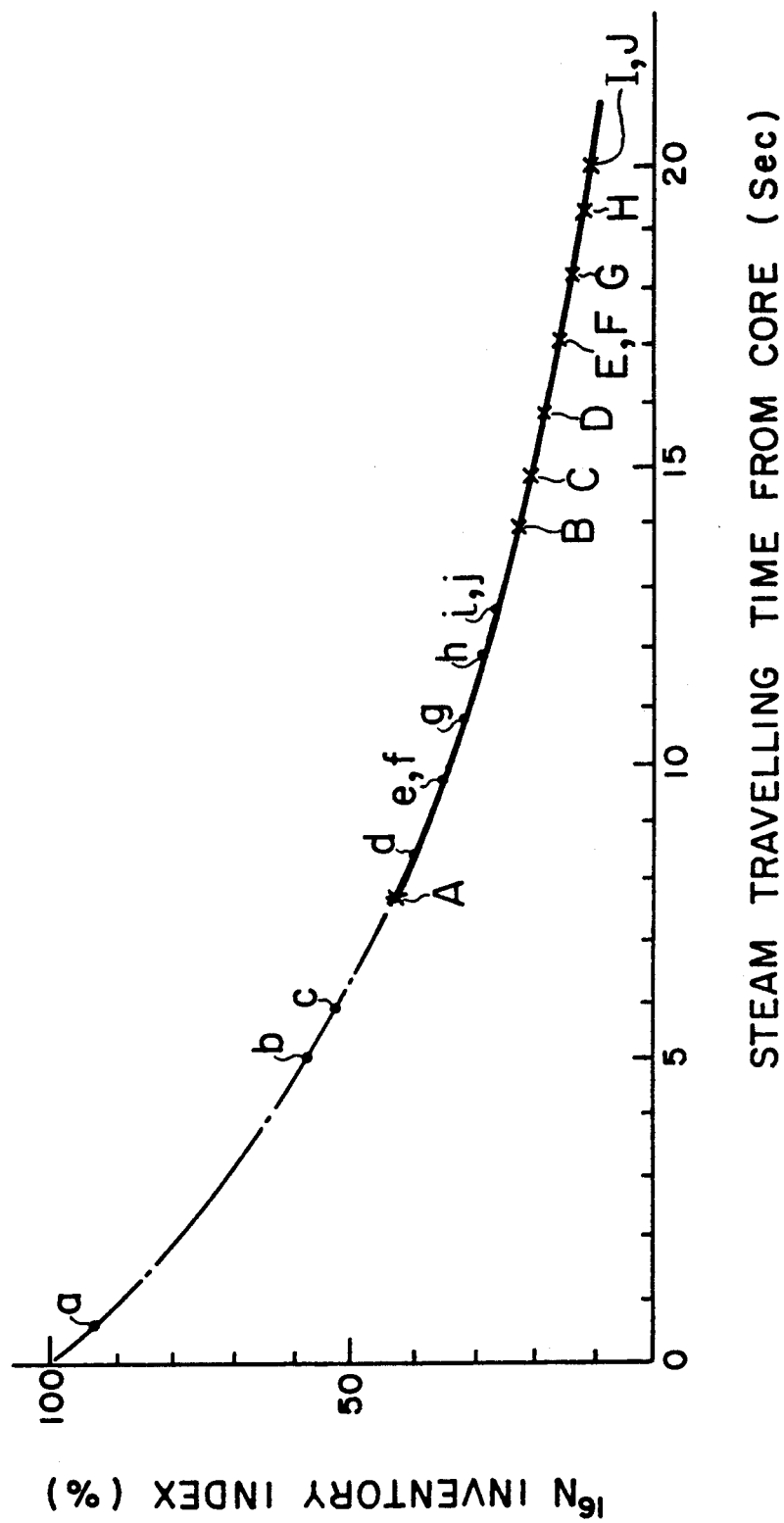

NATURAL CIRCULATION TYPE BOILING LIGHT-WATER REACTOR

FIELD OF THE INVENTION AND RELATED ART STATEMENT

This invention relates to a natural circulation type boiling light-water reactor.

In a typical nuclear power plant employing a boiling light-water reactor, main steam generated in the boiling light-water reactor is supplied to a turbine system including turbines so as to convert thermal energy of the main steam into electric energy.

Since the main steam generated contains radioactive substance, a reactor system, a turbine system, and a piping system for interconnecting therebetween are shielded by radiation shield structures, respectively. This results in the prevention of leakage of the radiation from the radioactive substance to the outside.

The main radioactive substance contained in the main steam is nitrogen isotope $^{16}N$. $^{16}N$ is produced by the following reaction of neutron with oxygen isotope $^{16}O$ contained in light water in a reactor core or coolant (that is, reaction of neutrons with nuclei, i.e., charged particle production reaction or (n, p) reaction):

$$^{16}O + n \rightarrow {^{16}N} + {^{1}H}$$

In ordinary coolant, $^{16}N$ produced soon becomes anions of strong nonvolatility such as, $NO_2^-$ or $NO_3^-$. Therefore, the amount of $^{16}N$ contained in the main steam is small.

In recent years, it has been practiced to pour deoxidizer into the coolant for the purpose of improving the quality of coolant. Pouring the deoxidizer into the coolant results in the reduction in oxidation potential of the coolant. Due to such reduction, cations such as $NH_4^+$, which are readily converted into volatile isotope $^{16}N$ are increased.

Further, there are known $H_2$, $NH_3$, $N_2H_4$ and the like as substance to be poured into the coolant besides the deoxidizer. These substances are also important factors for the increase of $^{16}N$, the same as the deoxidizer is.

To cope with this increase of $^{16}N$, not only a reactor pressure vessel but also the turbine and the piping systems are shielded by the radiation shield structures made of concrete or iron, with the result that the leakage of the radiation from $^{16}N$ to the outside is suppressed satisfactorily.

However, with the increase of $^{16}N$ in the main steam, the shield structures have become heavy and thick and enlarged, thus bringing about an increase of the plant construction cost.

OBJECT AND SUMMARY OF THE INVENTION

It is therefore an object of the present invention to provide a natural circulation type boiling light-water reactor which makes a contribution to the reduction in weight and dimensions of shielding structures of turbine and piping systems.

To this end, there is provided according to the present invention a natural circulation type boiling light-water reactor comprising: a pressure vessel divided into a steam/water chamber and a steam chamber; a reactor core disposed within the steam/water chamber to generate main steam which contains radioactive isotope $^{16}N$, the reactor core including a plurality of fuel elements; a shroud disposed within said steam/water chamber encircling the reactor core; a steam dryer assembly through which the main steam generated flows from said shroud into the steam chamber to reduce a wetness fraction of the main steam; a chimney connected at one end thereof to the shroud and extending within the steam/water chamber toward the steam chamber, through which the main steam flows together with said radioactive isotope $^{16}N$, the chimney being filled with light water as coolant and having the other end thereof opened toward the steam dryer assembly; a steam outlet through which the main steam generated is drawn out of the pressure vessel, the steam outlet being provided in a wall of the pressure vessel; and steam passage means through which the main steam generated flows from said shroud to said steam outlet via said steam dryer assembly.

The inventory of the radioactive substance $^{16}N$ in the pressure vessel depends upon the time period while $^{16}N$ flows within the pressure vessel. According to the present invention, the radioactive substance $^{16}N$ contained in the main steam generated by the reactor core is allowed to flow within the pressure vessel of the reactor taking a time period longer than a half-life of $^{16}N$ (about seven seconds). Namely, according to the present invention, the time period while the main steam flows within the pressure vessel is prolonged by controlling the velocity of the main steam and/or increasing the length of the path for the main steam.

Accordingly, the inventory of the radioactive substance $^{16}N$ is reduced in the reactor pressure vessel so that the amount of $^{16}N$ contained in the main steam directed from the reactor pressure vessel towards the turbine system becomes smaller. In consequence, it is possible to reduce the weight and dimensions of the shielding structures for the piping and the turbine systems. In addition, it is possible to further improve the shielding effect in case of the use of conventional shield structures.

Effects and functions of the present invention will become more clear from the description of a preferred embodiment to be described in the following with reference to the accompanying drawings.

BRIEF DESCRIPTION OF THE DRAWINGS

FIGS. 3A and 3B are diagrams illustrating the flows of main steam in the reactors shown in FIGS. 1 and 2, respectively;

FIG. 4C is a graph showing the relationship between the steam travelling time from the upper end of the reactor core and the inventory of $^{16}N$ at the respective spots shown in FIGS. 4A and 4B.

DETAILED DESCRIPTION OF THE PREFERRED EMBODIMENTS

Figure 1:
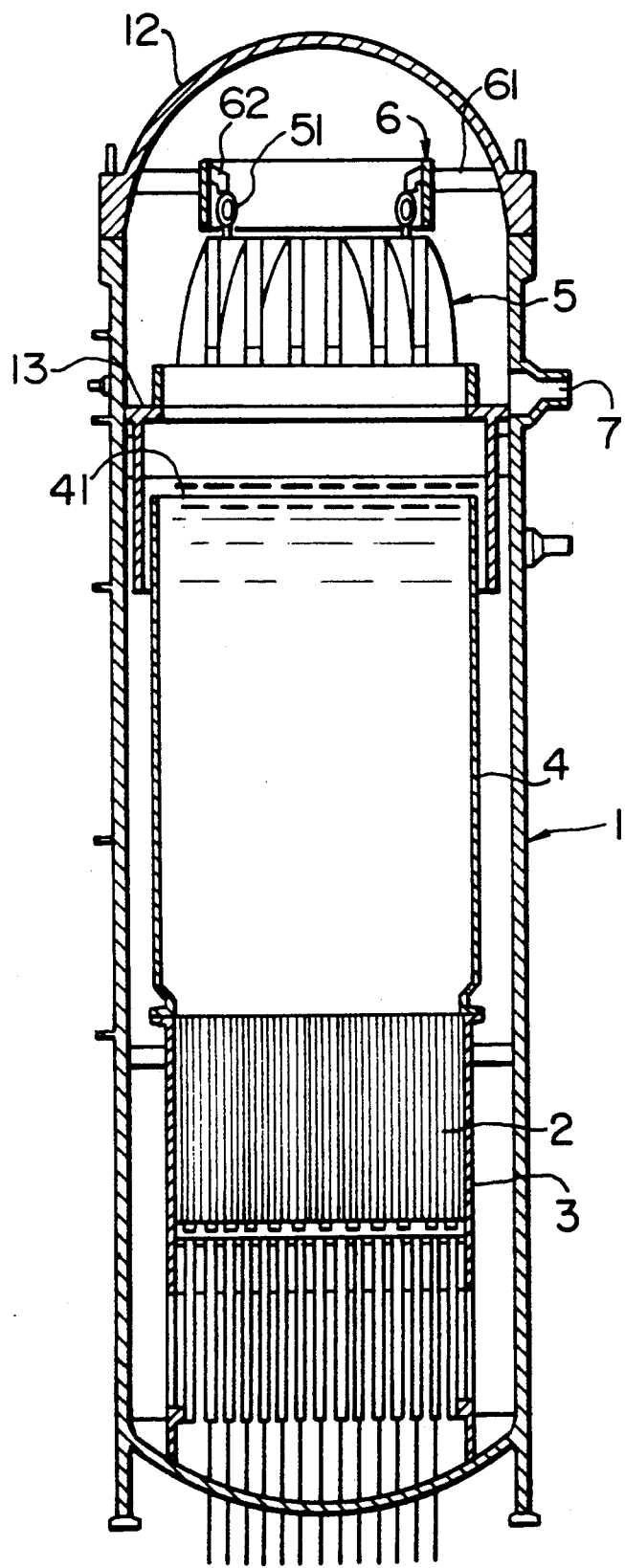
FIG. 1 is a sectional view of a natural circulation type boiling light-water reactor according to an embodiment of the present invention.

Referring to FIG. 1, a natural circulation type boiling light-water reactor according to an embodiment of the present invention has a pressure vessel 1 which is divided into a steam/water chamber and a steam chamber. A reactor core 2 provided with a fuel assembly including a plurality of fuel elements is disposed in the steam/water chamber of the pressure vessel 1. A core shroud 3 encircles the reactor core 2.

A tubular chimney 4 extends from an upper end portion of the core shroud 3 towards the steam/water chamber. The chimney 4 is filled with light water as coolant. The inside diameter of the chimney 4 is greater than the outside diameter of the core shroud 3. In addition, an end 41 of the chimney 4, that is, a water surface of the coolant, is opened towards a steam dryer assembly 5 which will be described later, and therebetween there exists nothing to restrict the effective open area of the water surface.

The steam dryer assembly 5 is disposed above the chimney 4, through which the steam/water chamber and the steam chamber of the pressure vessel 1 are communicated with each other. The dryer assembly 5 is mounted on a circumferential flange 13 projected radially inwards from the wall of the pressure vessel 1.

A tubular steam guide 6 is attached to an outlet of the steam dryer assembly 5. The steam guide 6 is fixed to a top head portion 12 of the pressure vessel 1 through a stay 61. The steam guide 6 extends upwards within the steam chamber. When the top head portion 12 is assembled into the pressure vessel 1, projections 61 provided in the steam guide 6 are abutted onto eyenuts 51 provided in a top end of the dryer assembly 5 to press it against the projection 13 so as to fixedly retain it with respect to the projection 13.

A steam outlet 7 is provided in a portion of the wall of the pressure vessel 1 corresponding to the steam chamber.

An operation of the reactor having the abovedescribed arrangement will be described hereinunder.

First, when the reactor is driven, the reactor core heats and boils the light water so as to generate steam. The steam generated comes up as main steam within the chimney 4. The main steam further comes up from the water surface of the coolant in a gas-liquid two-phase state (that is, steam and water droplets) toward the steam dryer assembly 5. As a result, the light water overflows from the chimney end 41 to flow down through a space defined between the pressure vessel 1 and both the chimney 4 and the shroud 3 towards the bottom of the reactor core, and then, it is heated again by the reactor core. In this way, a natural circulation of the coolant is accomplished.

While the main steam passes through the steam dryer assembly 5, the wetness fraction thereof is reduced, and the main steam then comes up within the steam chamber along the steam guide 6 while being guided by the same. Subsequently, the main steam flows down toward the steam outlet 7 so as to be supplied to the turbine system through the steam outlet 7. Thus, a steam path is so formed that it extends from the shroud 3 to the steam outlet 7.

In the present embodiment, the end 41 of the chimney 4, that is, the water surface of the coolant, is opened towards the steam dryer assembly 5. In other words, between the water surface of the coolant and the steam dryer assembly 5, there exists nothing to restrict the effective open area thereof. To the contrary, in a conventional forced circulation boiling light-water reactor shown in FIG. 2, a shroud 3 is closed at the end portion thereof, and a steam separator assembly 8 which comprises a plurality of steam separators each having a reduced sectional area is communicated with the closed end portion of the shroud. (Elements acting in the same manner as the corresponding ones shown in FIG. 1 are designated by the same reference numerals, respectively, and description of the operation thereof will be omitted. It is noted, however, that the dimensions of the elements designated by the same reference numeral are substantially equal with each other.) In the reactor shown in FIG. 2, since the effective area of the steam path is decreased by the steam separator assembly 8, the velocity of the main steam flowing within the steam separator assembly 8 is increased. Therefore, it takes the main steam about five seconds to flow from the shroud 3 to the steam outlet 7, that is, through the steam path. On the other hand, in the present embodiment, since no steam separator assembly 8 is provided, the effective area of the steam path is never decreased. In consequence, the main steam comes up slowly from the chimney end 41 at a reduced velocity towards the steam dryer assembly 5, thus flowing through the steam path taking a time period longer than five seconds. In addition, since the inside diameter of the chimney 4 is made greater than the outside diameter of the core shroud 3, the velocity of the main steam flowing within the chimney 4 is reduced less than the velocity of the main steam in the core shroud 3.

Further, in the present embodiment, the provision of the steam guide 6 makes it possible to prevent the main steam from taking a short cut from the steam dryer assembly 5 to the steam outlet 7. Namely, the steam path is prolonged. In consequence, the time period while the main steam flows through the steam path is made further longer. By referring to FIGS. 3A and 3B, description will be given of the relationship between the length of the steam path and the velocity of flow of the main steam in detail making a comparison between the reactor of the present embodiment shown in FIG. 1 and the reactor shown in FIG. 2.

A velocity V1 of the main steam flowing within the chimney 4 is lower than a velocity v1 of the main steam flowing within an extended part of the core shroud which corresponds to the chimney (V1<v1). This is because, on the assumption that the amounts of the main steam generated in the reactor cores per unit time are identical, the velocity of the main steam flowing through the extended part of the shroud, the effective sectional area of which is equal to the sectional area of the core shroud 3, is unchanged and identical to that flowing through the core shroud 3, while the velocity of the main steam flowing within the chimney 4, the effective sectional area of which is increased as compared with the sectional area of the core shroud 3, is reduced. In addition, a velocity V2 of the main steam flowing through the space defined between the chimney 4 and the steam dryer assembly 5 is lower than a velocity v2 of the main steam flowing within the steam separator assembly 8 which corresponds to the space referred above (V2<v2). This is because the velocity of flow of the main steam flowing within the steam separator assembly 8, the effective sectional area of which is decreased, is increased, while the velocity of the main steam flowing through the open space defined between the chimney 4 and the steam dryer assembly 5 is reduced.

In this way, since the main steam flows through substantially the same distance (L1+L2=l1+l2) at a reduced velocity according to the present embodiment, it takes a longer time to flow from the core shroud 3 to the steam dryer assembly 5 in comparison with the conventional one.

Subsequently, in the steam dryer assembly 5, the velocity of the main steam is reduced at a predetermined rate in either case (V3<v3 and L3=l3).

The main steam coming out of the steam dryer assembly 5 then flows within the steam chamber at a velocity V4 which is smaller than a velocity v4 obtained in the conventional one (V4<v4). Furthermore, in the present embodiment, since the steam guide 6 prevents the main steam from taking a short cut to the steam outlet 7 that is, since the steam path is prolonged (L4>l4), it takes the main steam a longer time period to flow from the steam guide 6 to the steam outlet 7, as compared with the conventional one.

As clearly seen from the foregoing description, according to the reactor of the present embodiment, the time period while the main steam flows within the pressure vessel is made longer as compared with the conventional reactor. That time period is about five seconds in the conventional reactor, so that the time period referred above can be made sufficiently longer than a half-life of $^{16}N$ (about seven seconds) provided that the dimensions of the elements are unchanged. As a result, the amount of $^{16}N$ contained in the main steam can be remarkably reduced within the pressure vessel 1. In consequence, the amount of $^{16}N$ in the main steam to be supplied to the turbine system is small so that a shield structure which is reduced in size and weight in comparison with conventional ones can be safely applied to the turbine and the piping systems.

Figure 2:
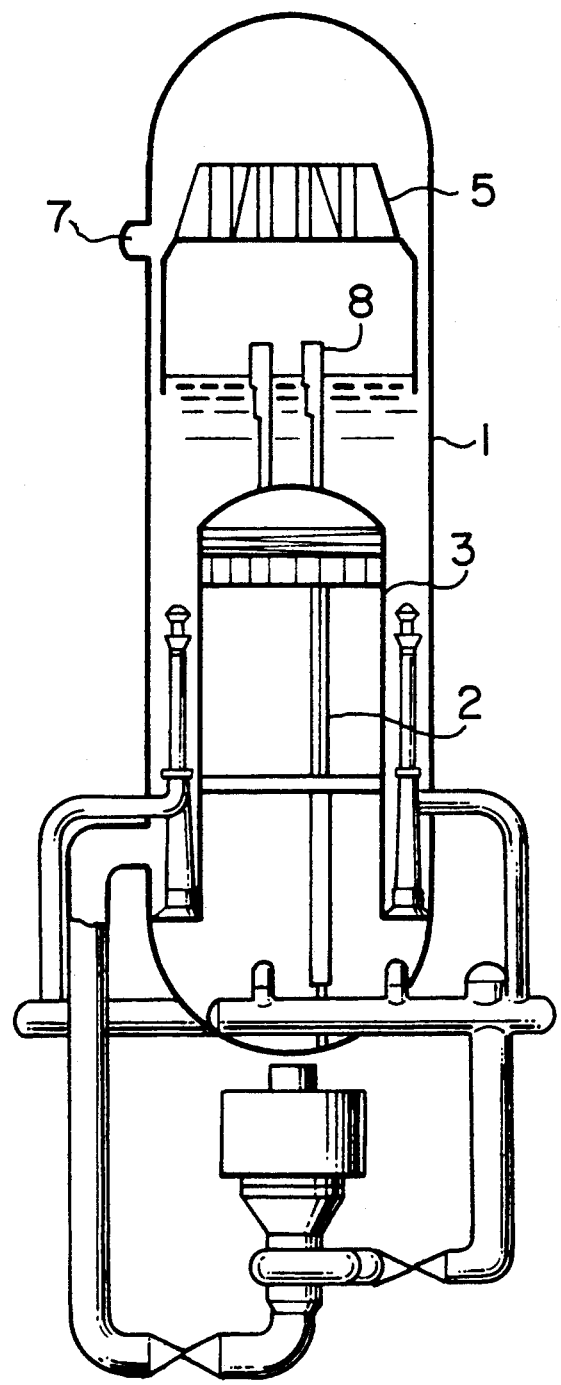
FIG. 2 is a sectional view of a conventional forced circulation boiling light-water reactor.
Figure 4A:
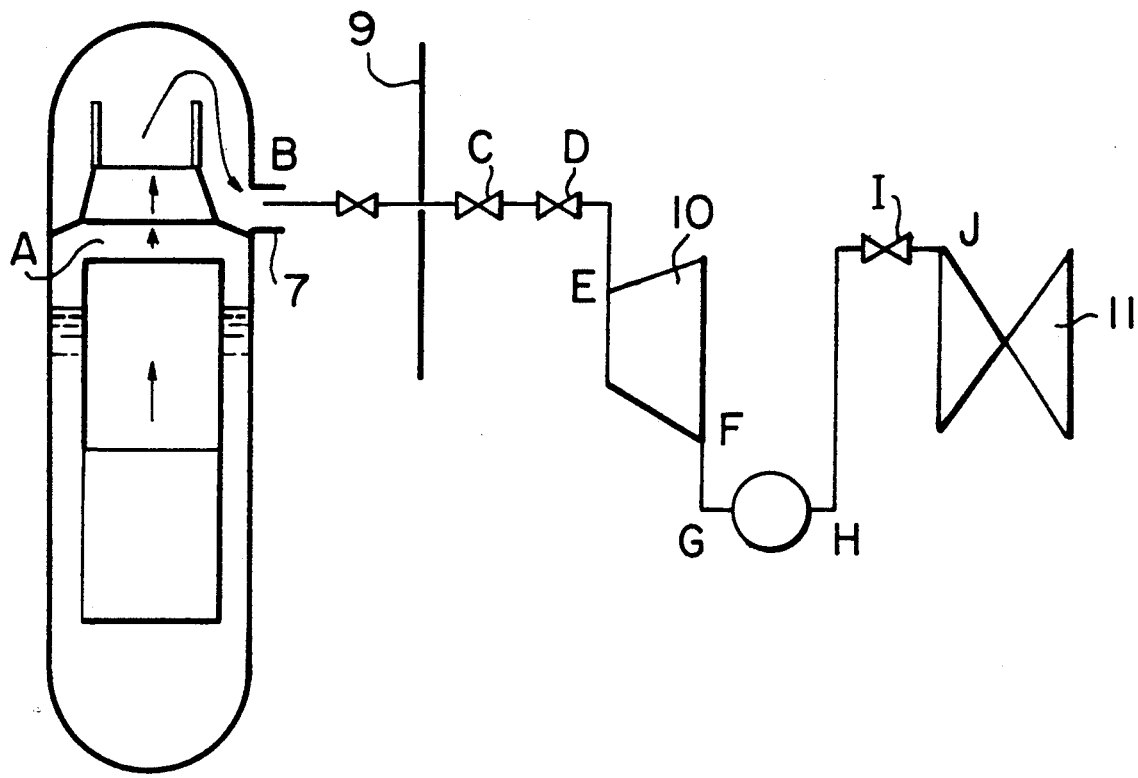
FIGS. 4A and 4B are diagrams illustrating various spots in plants employing the reactors shown in FIGS. 1 and 2, respectively.
Figure 4B:
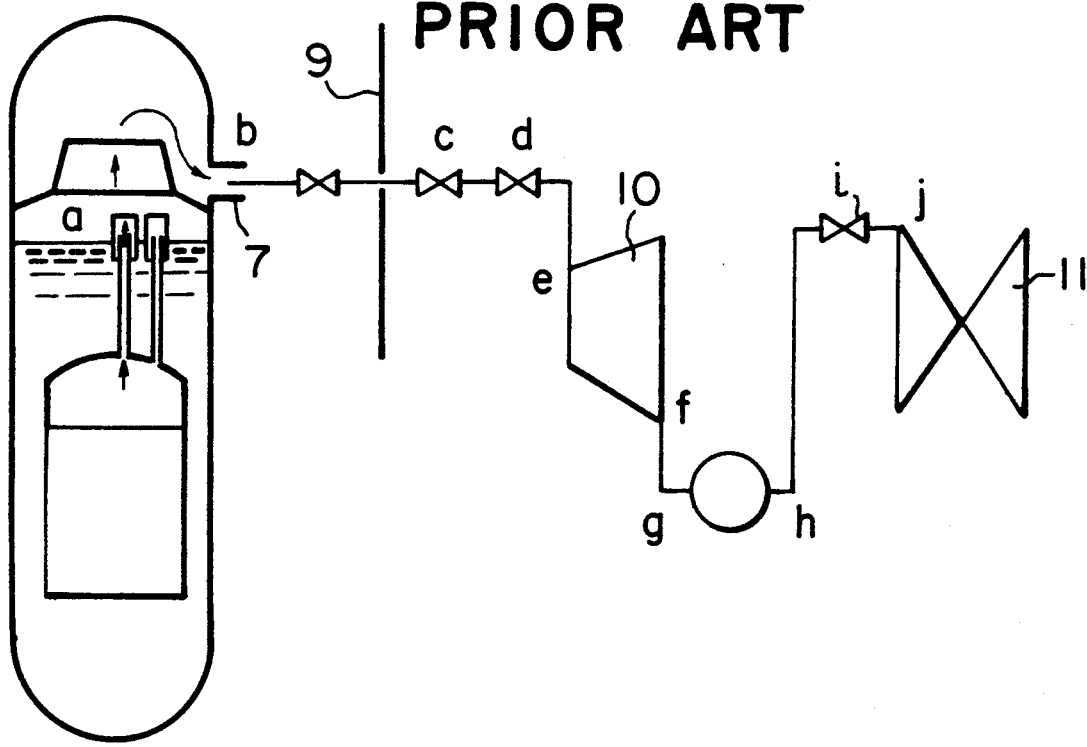

Comparison will be made between the reactors shown in FIGS. 1 and 2 in terms of the relationship between the $^{16}N$ inventory index (inventory of $^{16}N$ in the main steam/inventory of $^{16}N$ in the main steam in the conventional core shroud (shown in FIG. 2)) at various spots of the power plants and the time period for the main steam to travel from the core shroud 3 to the respective spots, with reference to FIGS. 4A to 4C. Incidentally, reference numerals 9, 10 and 11 designate a reactor housing vessel, a high pressure turbine, and a low pressure turbine, respectively.

As understood from the drawings, in the conventional power plant, the time period to travel to the steam dryer assembly 5 is about one second and that to the steam outlet 7 is about five seconds. On the other hand, according to the present embodiment, the time period to travel to the steam dryer assembly 5 is prolonged to about eight seconds and that to the steam outlet 7 is prolonged to about fourteen seconds (or twice of the half-life of $^{16}N$). This results in that although the inventory of $^{16}N$ at the steam outlet 7 in the conventional power plant is 60% of that in the core shroud, the inventory of $^{16}N$ at the steam outlet 7 in the power plant employing the present embodiment is reduced to 25% of that in the core shroud. That is to say, the inventory of $^{16}N$ at the steam outlet 7 according to the present embodiment is reduced to about 40% (=25/60) in comparison with that according to the conventional art. This means that the thickness of the shield structure for the turbine system can be reduced by about 15 cm upon calculation in terms of concrete.

According to the present invention, the above-mentioned effects can be obtained by reducing the velocity of the main steam within the pressure vessel and/or increasing the length of the flow path for the main steam. In consequence, other embodiments than the above-described one are also practicable; the one in which axial dimension of the chimney 4 is increased, the one in which a resistance through a passage of the steam dryer assembly is increased, and the like. Further, the above-described guide 6 is not limited to the illustrated one employed in the present embodiment and it may be replaced by the one which is inclined toward the direction opposite to the steam outlet or the one which spirals.

What is claimed is:

1. A natural circulation type boiling light-water reactor comprising:
   a pressure vessel divided into a steam/water chamber and a steam chamber;
   a reactor core disposed within said steam/water chamber to generate main steam which contains radioactive isotope $^{16}N$, said reactor core including a plurality of fuel elements;
   a shroud disposed within said steam/water chamber encircling said reactor core;
   a steam dryer assembly through which the main steam generated from said shroud passes into said steam chamber to reduce a wetness fraction of said main steam;
   a chimney connected at one end thereof to said shroud and extending within said steam/water chamber toward said steam chamber, through which the main steam flows together with said radioactive isotope $^{16}N$, said chimney being filled with light water as coolant and having the other end thereof opened toward said steam dryer assembly;
   a steam outlet through which the main steam generated is drawn out of said pressure vessel, said steam outlet being provided in a wall of said pressure vessel; and
   steam passage means through which the main steam generated passes from said shroud to said steam outlet via said steam dryer assembly.

2. A reactor according to claim 1, wherein it takes said main steam a time period twice or more longer than a half-life of said radioactive isotope $^{16}N$ to flow from said shroud to said steam outlet.

3. A reactor according to claim 2, wherein said reactor further comprises means for prolonging said steam passage means.

4. A reactor according to claim 3, wherein said prolonging means includes a steam guide connected to one end of said steam dryer assembly and extending within said steam chamber, and wherein said steam outlet is provided in a portion of said wall of said pressure vessel located below an outlet of said steam guide.

5. A reactor according to claim 3, wherein said prolonging means is constituted by increasing axial dimension of said chimney.

6. A reactor according to claim 4, wherein said prolonging means is also constituted by increasing axial dimension of said chimney.

7. A reactor according to claim 2, wherein said reactor further comprises means for reducing a travelling speed of said main steam in said steam passage means.

8. A reactor according to claim 7, wherein said travelling speed reducing means is constituted by increasing radial inside dimension of said chimney beyond the extend of said shroud.

9. A process for drawing main steam containing radioactive isotope $^{16}N$ out of a natural circulation type boiling light-water reactor, comprising the steps of:
   naturally circulating light water within a pressure vessel through a reactor core so as to generate main steam containing radioactive isotope $^{16}N$;
   making said main steam generated travel in said pressure vessel with taking a time period twice or more longer than a half-life of said radioactive isotope $^{16}N$; and
   drawing said main steam generated out of said pressure vessel.

* * * * *